(12) United States Patent
Zwieg et al.

(10) Patent No.: US 9,021,776 B2
(45) Date of Patent: May 5, 2015

(54) HEIGHT OF CUT SYSTEM FOR LAWN MOWER

(71) Applicant: Ariens Company, Brillion, WI (US)

(72) Inventors: Brian Zwieg, Brillion, WI (US); Kariann Kalista, Kiel, WI (US); Daniel J. Gindt, Brillion, WI (US)

(73) Assignee: Ariens Company, Brillion, WI (US)

( * ) Notice: Subject to any disclaimer, the term of this patent is extended or adjusted under 35 U.S.C. 154(b) by 280 days.

(21) Appl. No.: 13/623,231

(22) Filed: Sep. 20, 2012

(65) Prior Publication Data

US 2013/0074467 A1 Mar. 28, 2013

Related U.S. Application Data

(60) Provisional application No. 61/537,960, filed on Sep. 22, 2011.

(51) Int. Cl.
| | |
|---|---|
| *A01D 34/00* | (2006.01) |
| *A01D 34/64* | (2006.01) |
| *A01D 34/74* | (2006.01) |
| *A01D 34/82* | (2006.01) |
| *A01D 69/03* | (2006.01) |

(52) U.S. Cl.
CPC ............... *A01D 34/64* (2013.01); *A01D 34/74* (2013.01); *A01D 34/82* (2013.01); *A01D 69/03* (2013.01)

(58) Field of Classification Search
USPC ................ 56/17.1, 14.9, 17.2, 15.9, DIG. 22; 280/43.13, 43.16; 172/395, 43
See application file for complete search history.

(56) References Cited

U.S. PATENT DOCUMENTS

| | | | | |
|---|---|---|---|---|
| 2,848,859 | A | * | 8/1958 | Abel ............................... 56/17.2 |
| 3,269,100 | A | * | 8/1966 | Smith ............................ 56/17.2 |
| 3,677,574 | A | * | 7/1972 | Cyr ............................ 280/43.13 |
| 4,577,455 | A | * | 3/1986 | Amano et al. ................. 56/17.1 |
| 4,709,541 | A | | 12/1987 | Broman et al. |
| 4,787,646 | A | | 11/1988 | Kamlukin et al. |
| 4,790,399 | A | | 12/1988 | Middlesworth |
| 4,828,282 | A | | 5/1989 | Pinto |
| 4,878,339 | A | | 11/1989 | Marier et al. |

(Continued)

FOREIGN PATENT DOCUMENTS

JP    5097049    4/1993

OTHER PUBLICATIONS

Co-Pending U.S. Appl. No. 13/623,227, filed Sep. 20, 2012.

(Continued)

*Primary Examiner* — Arpád Fábián-Kovács
(74) *Attorney, Agent, or Firm* — Michael Best & Friedrich LLP (57) ABSTRACT

A deck lifting and height of cut assembly for a lawn mower, in which the deck lifting assembly includes at least one movable component and the height of cut assembly includes a height adjustment mechanism having a plurality of stop surfaces. A prop extends between the movable component of the deck lifting assembly and a first stop surface of the height adjustment mechanism to prevent the cutting deck assembly from lowering below a first height. The height adjustment mechanism is adjustable to place a second stop surface in engagement with the prop so that the cutting deck assembly is prevented from lowering below a second height different from the first height. The prop may also be used to maintain the cutting deck assembly in the full-up position during travel of the lawn mower between work areas.

13 Claims, 11 Drawing Sheets

(56) References Cited

U.S. PATENT DOCUMENTS

| | | |
|---|---|---|
| 4,962,636 A * | 10/1990 | Sampei et al. .................. 56/17.1 |
| 4,991,382 A | 2/1991 | Scag |
| 5,004,251 A | 4/1991 | Velke et al. |
| 5,094,078 A | 3/1992 | Nishimura et al. |
| 5,131,483 A | 7/1992 | Parkes |
| 5,133,176 A | 7/1992 | Baumann et al. |
| 5,205,112 A | 4/1993 | Tillotson et al. |
| 5,212,938 A | 5/1993 | Zenner et al. |
| 5,230,208 A * | 7/1993 | Hess et al. ...................... 56/17.2 |
| 5,337,543 A | 8/1994 | Kitamura et al. |
| 5,363,635 A | 11/1994 | White, III et al. |
| 5,381,648 A * | 1/1995 | Seegert et al. .................. 56/17.1 |
| 5,413,364 A | 5/1995 | Hafendorfer |
| 5,463,853 A | 11/1995 | Santoli et al. |
| 5,507,138 A | 4/1996 | Wright et al. |
| 5,526,633 A * | 6/1996 | Strong et al. ................... 56/17.2 |
| 5,533,326 A | 7/1996 | Goman et al. |
| 5,575,140 A | 11/1996 | Bermes et al. |
| 5,600,944 A | 2/1997 | Wright et al. |
| 5,615,542 A | 4/1997 | Thorud et al. |
| 5,628,171 A | 5/1997 | Stewart et al. |
| 5,638,667 A | 6/1997 | Ellson et al. |
| 5,653,466 A | 8/1997 | Berrios |
| 5,697,623 A | 12/1997 | Bermes et al. |
| 5,765,347 A | 6/1998 | Wright et al. |
| 5,784,870 A * | 7/1998 | Seegert et al. ................ 56/320.1 |
| 5,809,755 A | 9/1998 | Velke et al. |
| 5,809,756 A | 9/1998 | Scag |
| 5,810,371 A | 9/1998 | Velke |
| 5,882,020 A | 3/1999 | Velke |
| 5,894,907 A | 4/1999 | Peter |
| 5,927,735 A | 7/1999 | Hosoda |
| 5,964,082 A | 10/1999 | Wright et al. |
| 5,984,031 A | 11/1999 | Velke et al. |
| 6,000,705 A | 12/1999 | Velke |
| 6,032,441 A | 3/2000 | Gust et al. |
| 6,044,634 A | 4/2000 | Velke et al. |
| 6,056,074 A | 5/2000 | Heal et al. |
| 6,059,055 A | 5/2000 | Velke et al. |
| 6,085,504 A | 7/2000 | Wright et al. |
| 6,094,897 A | 8/2000 | Velke et al. |
| 6,098,385 A | 8/2000 | Turk |
| 6,105,348 A | 8/2000 | Turk et al. |
| 6,125,630 A | 10/2000 | Abend et al. |
| 6,138,446 A | 10/2000 | Velke et al. |
| 6,155,033 A | 12/2000 | Wians et al. |
| 6,155,034 A | 12/2000 | Velke et al. |
| 6,182,429 B1 | 2/2001 | Velke et al. |
| 6,185,920 B1 | 2/2001 | Oxley |
| 6,189,304 B1 | 2/2001 | Velke et al. |
| 6,189,305 B1 | 2/2001 | Wright et al. |
| 6,205,753 B1 | 3/2001 | Velke et al. |
| 6,234,495 B1 | 5/2001 | Velke |
| 6,276,486 B1 | 8/2001 | Velke et al. |
| 6,301,864 B1 | 10/2001 | Damie et al. |
| 6,301,865 B1 | 10/2001 | Velke et al. |
| 6,327,839 B1 | 12/2001 | Velke et al. |
| 6,341,478 B1 | 1/2002 | Sallstrom et al. |
| 6,351,929 B1 | 3/2002 | Gust et al. |
| 6,405,515 B1 | 6/2002 | Wright et al. |
| 6,415,587 B1 | 7/2002 | Velke et al. |
| 6,438,930 B1 | 8/2002 | Velke et al. |
| 6,438,931 B1 | 8/2002 | Velke et al. |
| 6,442,917 B1 | 9/2002 | Velke et al. |
| 6,460,640 B1 | 10/2002 | Keagle et al. |
| 6,485,036 B1 | 11/2002 | Bricko |
| 6,490,849 B1 | 12/2002 | Scag et al. |
| 6,497,422 B1 | 12/2002 | Bellis, Jr. |
| 6,499,282 B1 | 12/2002 | Velke et al. |
| 6,516,596 B2 | 2/2003 | Velke et al. |
| 6,550,242 B2 | 4/2003 | Abend et al. |
| 6,550,563 B2 | 4/2003 | Velke et al. |
| 6,560,952 B2 | 5/2003 | Velke et al. |
| 6,568,498 B2 | 5/2003 | Abend et al. |
| 6,571,555 B2 | 6/2003 | Abend et al. |
| 6,625,965 B2 | 9/2003 | Wright et al. |
| 6,640,526 B2 | 11/2003 | Velke et al. |
| 6,648,095 B2 | 11/2003 | Abend et al. |
| 6,658,831 B2 | 12/2003 | Velke et al. |
| 6,688,090 B2 | 2/2004 | Velke et al. |
| 6,705,080 B2 | 3/2004 | Abend et al. |
| 6,729,115 B2 | 5/2004 | Bartel |
| 6,739,116 B2 | 5/2004 | Stover et al. |
| 6,766,633 B2 | 7/2004 | Wanie et al. |
| 6,782,964 B1 | 8/2004 | Korthals et al. |
| 6,862,872 B2 | 3/2005 | Wright et al. |
| 6,868,657 B2 | 3/2005 | Bauer et al. |
| 6,868,658 B2 | 3/2005 | Velke et al. |
| 6,877,302 B2 | 4/2005 | Samejima et al. |
| 6,912,831 B2 | 7/2005 | Velke et al. |
| 6,935,092 B2 | 8/2005 | Velke et al. |
| 6,935,093 B2 | 8/2005 | Velke et al. |
| 6,968,687 B1 | 11/2005 | Poplawski et al. |
| 7,043,908 B2 | 5/2006 | Irikura et al. |
| 7,047,716 B2 | 5/2006 | Lang |
| 7,051,499 B2 | 5/2006 | Goto et al. |
| 7,121,093 B2 | 10/2006 | Abend et al. |
| 7,240,473 B2 | 7/2007 | Docken et al. |
| 7,272,920 B2 | 9/2007 | Wright et al. |
| 7,318,311 B2 | 1/2008 | Wright et al. |
| 7,325,388 B2 | 2/2008 | Wright et al. |
| 7,364,169 B2 | 4/2008 | Velke et al. |
| 7,428,884 B2 | 9/2008 | Velke et al. |
| 7,458,588 B2 | 12/2008 | Kallevig et al. |
| 7,467,677 B2 | 12/2008 | Barrier |
| 7,478,689 B1 | 1/2009 | Sugden et al. |
| 7,520,114 B2 | 4/2009 | Bergsten et al. |
| 7,523,795 B2 | 4/2009 | Velke et al. |
| 7,527,285 B2 | 5/2009 | Vachal |
| 7,536,858 B2 | 5/2009 | Abend et al. |
| 7,540,135 B2 * | 6/2009 | Strope .............................. 56/17.1 |
| 7,574,852 B1 | 8/2009 | Loxterkamp et al. |
| 7,587,886 B1 | 9/2009 | Sugden |
| 7,594,379 B2 | 9/2009 | Nicholson et al. |
| 7,596,934 B2 | 10/2009 | Waesche et al. |
| 7,607,283 B2 | 10/2009 | Wright et al. |
| 7,611,155 B2 | 11/2009 | Bares |
| 7,614,207 B2 * | 11/2009 | Elhardt et al. .................. 56/17.1 |
| 7,624,562 B2 | 12/2009 | Kallevig et al. |
| 7,624,996 B2 | 12/2009 | Velke et al. |
| 7,647,754 B2 | 1/2010 | Velke et al. |
| 7,712,294 B2 | 5/2010 | Wright et al. |
| 7,716,906 B2 * | 5/2010 | Swart .............................. 56/17.1 |
| 7,730,577 B2 | 6/2010 | Wood |
| 7,753,160 B2 | 7/2010 | Velke et al. |
| 7,775,025 B1 | 8/2010 | Coffin et al. |
| 7,857,089 B1 | 12/2010 | Sugden et al. |
| 7,870,710 B2 * | 1/2011 | Koehn ............................. 56/15.9 |
| 7,882,914 B2 | 2/2011 | Scheele et al. |
| 7,908,833 B2 | 3/2011 | Nicholson et al. |
| 7,980,569 B2 | 7/2011 | Azure et al. |
| 8,096,374 B1 | 1/2012 | Papke et al. |
| 8,104,552 B2 | 1/2012 | Papke et al. |
| 8,141,886 B1 | 3/2012 | Sugden et al. |
| 8,250,862 B1 | 8/2012 | Iida et al. |
| 8,479,503 B2 | 7/2013 | Abend et al. |
| 8,561,382 B2 | 10/2013 | Gamble et al. |
| 2001/0001170 A1 | 5/2001 | Velke et al. |
| 2006/0237240 A1 | 10/2006 | Crumly |
| 2007/0137194 A1 | 6/2007 | Abend et al. |
| 2007/0137918 A1 | 6/2007 | Dong et al. |
| 2007/0144167 A1 | 6/2007 | Abend et al. |
| 2008/0034722 A1 | 2/2008 | Wright et al. |
| 2009/0173052 A1 * | 7/2009 | Swart .............................. 56/15.2 |
| 2010/0126792 A1 | 5/2010 | Kallevig |
| 2012/0000172 A1 | 1/2012 | Papke et al. |
| 2012/0000173 A1 | 1/2012 | Papke et al. |

OTHER PUBLICATIONS

Co-Pending U.S. Appl. No. 13/622,650, filed Sep. 19, 2012.

Scag Power Equipment, V-Ride Operator's Manual (2010) Part No. 03259, 63 pages.

* cited by examiner

HEIGHT OF CUT SYSTEM FOR LAWN MOWER

CROSS-REFERENCE TO RELATED APPLICATIONS

This application claims the benefit under 35 U.S.C. 119(e) of the filing date of U.S. Provisional Application No. 61/537,960, filed Sep. 22, 2011, the entire contents of which are incorporated herein by reference.

BACKGROUND OF THE INVENTION

The present invention relates to a deck lift and height of cut arrangement for a lawn mower.

SUMMARY OF THE INVENTION

A lawn mower comprising: a plurality of wheels; a frame supported by the wheels; a mower drive assembly supported by the frame and driving rotation of at least one of the wheels to propel the lawn mower; a cutting deck assembly including a cutting deck and at least one rotatable cutting blade beneath the cutting deck, the rotatable cutting blade rotating under the influence of the mower drive assembly, a height of the cutting deck assembly corresponding to a height of cut at which the cutting blade cuts grass under the cutting deck; and a height of cut assembly including an adjustable height setting member providing a plurality of stop surfaces and a prop engageable with the height setting member; wherein engagement of the prop with a first stop surface on the adjustable height setting member holds the cutting deck assembly at a first height corresponding to a first height of cut, and engagement of the prop with a second stop surface on the adjustable height setting member holds the cutting deck assembly at a second height corresponding to a second height of cut different from the first height of cut.

In some embodiments, the mower drive assembly includes first and second motors driving respective first and second of the plurality of wheels; and wherein the first and second motors are independently controllable to permit zero radius turning of the lawn mower.

In some embodiments, the lawn mower further comprises a cutting deck lift assembly operable to raise the height of the cutting deck assembly; wherein the cutting deck assembly lowers under the influence of gravity upon release of the cutting deck lift assembly; and wherein the prop abuts the first stop surface of the adjustable height setting member to prevent the cutting deck assembly from lowering below the first height. In some embodiments, the prop includes a first end interconnected to a movable component of the cutting deck lifting assembly, the movable component moving in a first direction during raising of the cutting deck assembly and in a second direction during lowering of the cutting deck assembly; wherein the prop includes a second end movable in response to movement of the moving component into engagement with one of the first and second stop surfaces of the adjustable height setting member; and wherein the prop resists movement of the movable component in the second direction while the prop is engaged with one of the first and second stop surfaces. In some embodiments, the movable component includes a pivotable lifting bracket. In some embodiments, the adjustable height setting member is adjustable to place the prop in abutment with the second stop surface to prevent the cutting deck assembly from lowering below the second height.

In some embodiments, the height of cut assembly includes an adjustment mechanism that actuates the adjustable height setting member to place the prop in abutment with a selected one of the first and second stop surfaces; wherein the lawn mower includes an operator zone within reach of an operator of the lawn mower during use of the lawn mower; and wherein the adjustment mechanism is in the operator zone. In some embodiments, the lawn mower further comprises a deck lifting assembly including an actuator in the operator zone, the deck lifting assembly operable to lift the mower deck assembly upon actuation of the actuator, to remove the prop from abutment with the adjustment mechanism; wherein the adjustment mechanism is adjustable while the prop is not in abutment with the adjustment mechanism. In some embodiments, the actuator includes a hand actuator that is actuated by an operator's hand and a foot actuator that is actuated with an operator's foot.

In some embodiments, the adjustable height setting member includes a cam having a cam surface that includes the first and second stop surfaces. In some embodiments, the cam surface includes a shoulder associated with each of the first and second stop surfaces; and wherein the prop engages the associated shoulder when engaging the first and second stop surfaces.

In some embodiments, the lawn mower further comprises at least one prop bracket defining a slot; wherein the prop includes a transverse pin received within the slot; wherein movement of the prop into and out of abutment with the adjustable height setting member is guided by a transverse pin in the prop moving in the slot. In some embodiments, the slot includes a height of cut zone and a travel zone; wherein the transverse pin is within the height of cut zone while the prop engages the first and second stop surfaces; wherein the transverse pin is within the travel zone when the cutting deck assembly is moved into a full-up position that is higher than the first and second heights; and wherein the cutting deck assembly is maintained in the full-up position by engagement of the transverse pin in the travel zone to facilitate movement of the lawn mower between areas of vegetation to cut.

In some embodiments, the lawn mower further comprises a detent mechanism for resiliently holding the adjustable height setting member at a selected position; wherein the detent mechanism permits movement of the adjustable height setting member upon sufficient force applied to the height setting member.

The invention also provides a height of cut assembly for a lawn mower having a cutting deck assembly that includes a cutting deck, at least one cutting blade under the cutting deck, an operator zone in which an operator of the lawn mower is positioned during operation of the lawn mower, a cutting deck lift assembly for raising the cutting deck assembly to adjust a height of cut of the cutting blade, the cutting deck lift assembly including in the operator zone an actuator with which an operator can raise the cutting deck assembly, the cutting deck assembly lowering under the influence of gravity upon releases of the actuator, the height of cut assembly comprising: an adjustable height setting member providing at least a first stop surface and a second stop surface; a prop engageable with the height setting member to resist lowering of the cutting deck assembly below a first height while the prop engages the first stop surface, and to resist lowering of the cutting deck assembly below a second height while the prop engages the second stop surface; and a height adjustment mechanism in the operator zone and interconnected with the adjustable height setting mechanism to selectively move one of the first stop surface and second stop surface into position for engagement by the prop.

In some embodiments, the adjustable height setting member includes a cam; wherein the first and second stop surfaces are positioned along a cam surface of the cam; and wherein the height adjustment mechanism is operable to pivot the cam about a pivot axis. In some embodiments, the prop includes a first end interconnected to a movable component of the cutting deck lifting assembly, the movable component moving in a first direction during raising of the cutting deck assembly and in a second direction during lowering of the cutting deck assembly; wherein the prop includes a second end movable in response to movement of the moving component into engagement with one of the first and second stop surfaces of the adjustable height setting member; and wherein the prop resists movement of the movable component in the second direction while the prop is engaged with one of the first and second stop surfaces. In some embodiments, the height of cut assembly further comprises a detent mechanism for resiliently holding the adjustable height setting member at a selected position; wherein the detent mechanism permits movement of the adjustable height setting member upon sufficient force applied to the height setting member.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
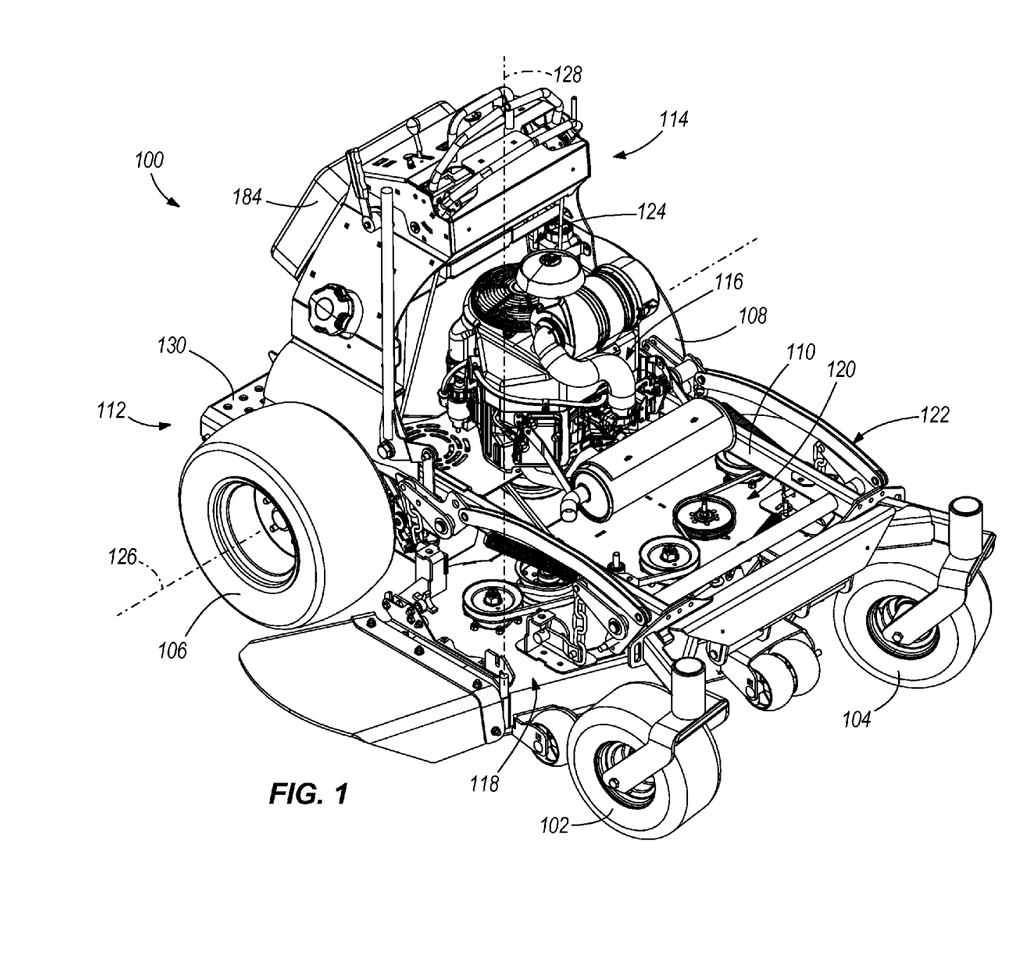
FIG. 1 is a front perspective view of a lawn mower.
Figure 2:
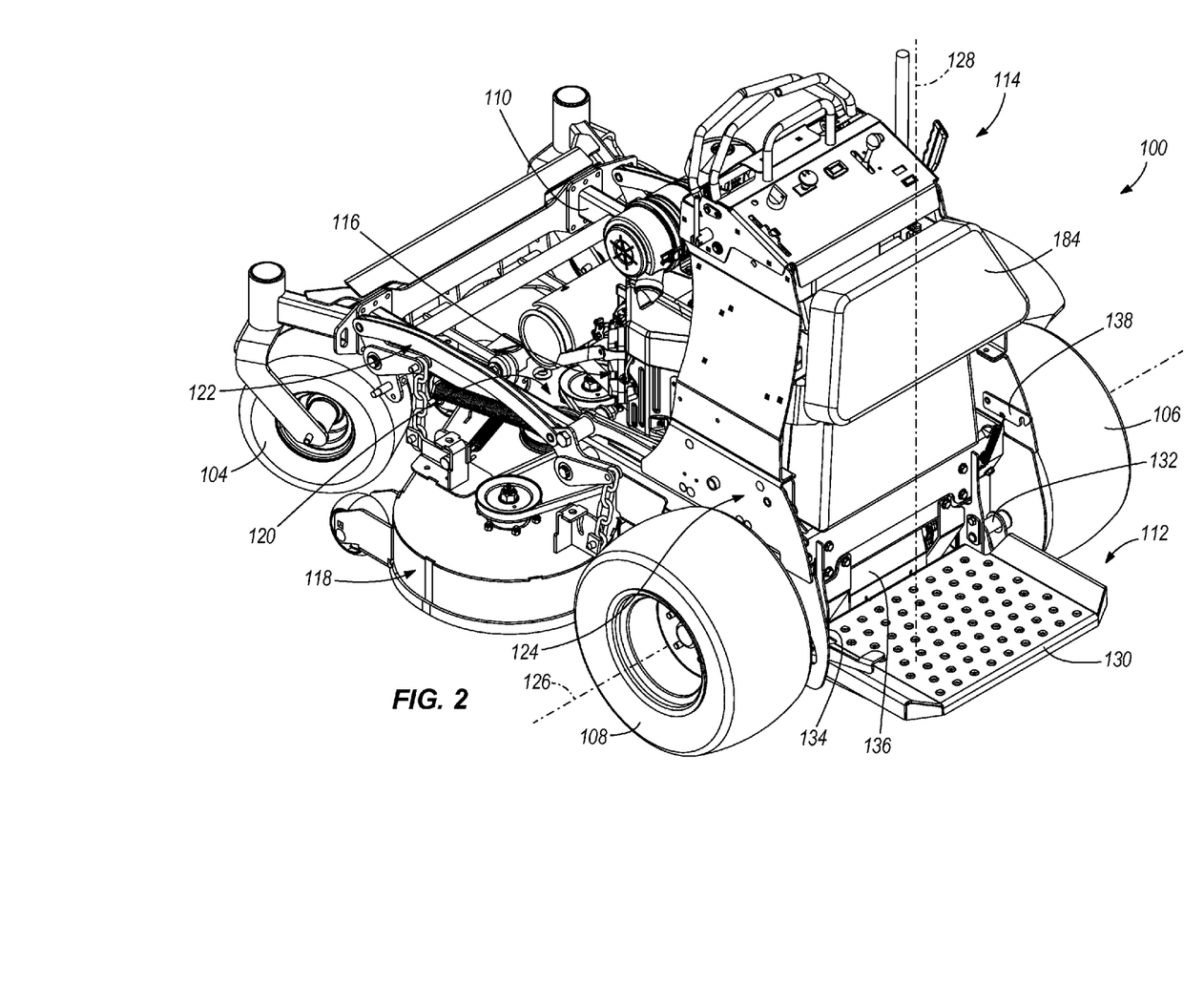
FIG. 2 is a rear perspective view of the lawn mower.

FIGS. 1 and 2 illustrate a lawn mower 100 embodying the present invention. The lawn mower 100 includes a right front wheel 102, a left front wheel 104, a right rear drive wheel 106, a left rear drive wheel 108, a frame 110, an operator platform assembly 112, a control tower 114, a mower drive assembly 116, a cutting deck assembly 118, a cutting deck transmission assembly 120, a cutting deck lift assembly 122, and a height of cut assembly 124. The figures illustrate a standing ride-on lawn mower 100, which is a lawn mower on which the operator stands rather than sits. Various features of this mower 100, including the mower drive assembly 116, the cutting deck lift assembly 122, and the height of cut assembly 124 are applicable to other types of lawn mowers, including walk behind lawn mowers and sitting ride-on lawn mowers.

For the purposes of the present specification, all spatial and directional terms shall, unless specifically stated otherwise, refer to space and direction as perceived by an operator of the lawn mower 100 in the lawn mower's intended operational orientation, moving over flat, horizontal ground. In ordinary operation, the lawn mower 100 is intended to be oriented with the front and rear wheels 102, 104, 106, 108 in contact with the ground and an operator standing on the operator platform assembly 112 facing toward the front wheels 102, 104. Consequently, the term "forward" and variations thereon shall mean in a direction parallel to the direction from the rear wheels 106, 108 toward the front wheels 102, 104. The term "front" and variations thereon shall mean positioned further in the forward direction than an element being compared. The term "reverse" and variations thereon shall mean in a direction parallel to the direction from the front wheels 102, 104 toward the rear wheels 106, 108. The term "rear" and variations thereon shall mean positioned further in the reverse direction than an element being compared. The terms "right," "left," and variations thereon shall be in reference to the respective right and left as viewed by a forward-looking operator. The terms "up," "down" and variations thereon shall be used as from the perspective of an operator standing on the operator platform assembly 112. The terms "above" and "over" shall mean intersecting a comparatively higher horizontal plane, and the terms "directly above" and "directly over" shall mean intersecting a comparatively higher horizontal plane and intersecting a common vertical line. The terms "below" and "under" shall mean intersecting a comparatively lower horizontal plane, and the terms "directly below" and "directly under" shall mean intersecting a comparatively lower horizontal plane and intersecting a common vertical line. Elements that are "directly above" or "directly below" other elements are also "above" or "below" the other elements, but the opposite is not necessarily true.

The right and left front wheels 102, 104 in the illustrated embodiment are of a variety commonly called "caster wheels." The right and left front wheels 102, 104 are passive, meaning that they are not driven under power. The right and left front wheels 102, 104 rotate about horizontal axes of rotation. The right and left front wheels 102, 104 are mounted to the frame 110 with an arrangement that permits the right and left front wheels 102, 104 to swivel with respect to the frame 110 about vertical axes to accommodate turning and rotating of the lawn mower 100. In some embodiments, the right and left front wheels 102. 104 are not passive, but instead can be actively steered by the operator.

The right and left rear drive wheels 106, 108 in the illustrated embodiments are driven under the influence of the mower drive assembly 116, as will be discussed in more detail below. As will be discussed, the right and left rear drive wheels 106, 108 in the illustrated embodiment are capable of rotating independent of one another in forward and reverse directions to cause forward, reverse, and turning movement of the lawn mower 100. The right and left drive wheels 106, 108 rotate about a common horizontal axis of rotation 126.

When the right and left drive wheels 106, 108 rotate in opposite directions (i.e., one forward and one reverse) at the same speed, the lawn mower 100 rotates about a zero-radius turning axis 128, which may also be referred to as a zero-turn axis or ZT axis. The ZT axis 128 is a vertical axis that intersects the horizontal axis of rotation 126 midway between the right and left rear drive wheels 106, 108. The intersection of the vertical ZT axis 128 and the horizontal axis of rotation 126 may be referred to as the "midpoint" between the right and left rear drive wheels 106, 108. The vertical plane that includes the horizontal axis of rotation 126 and the ZT axis 128 may be referred to as the "reference plane 126, 128."

The frame 110 is supported by the right and left front wheels 102, 104 and the right and left rear drive wheels 106, 108. The other systems of the lawn mower 100 (i.e., the operator platform assembly 112, the control tower 114, the mower drive assembly 116, the cutting deck assembly 118, the cutting deck transmission assembly 120, the cutting deck lift assembly 122, and the height of cut assembly 124) are supported by the frame 110.

Figure 4:
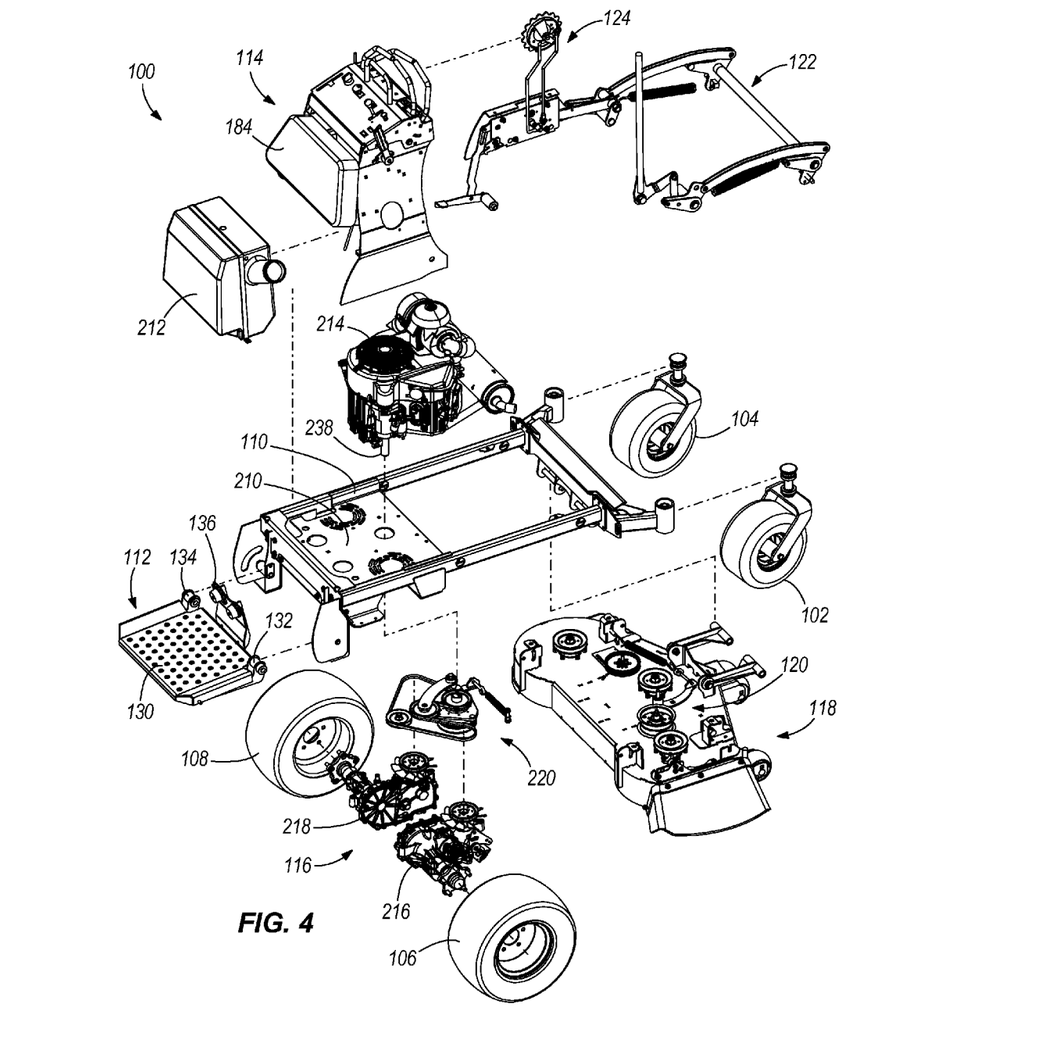
FIG. 4 is an exploded rear perspective view of the lawn mower.

As illustrated in FIG. 4, the operator platform assembly 112 includes an operator platform 130, a right pivot assembly 132, a left pivot assembly 134, a pivot limiting assembly 136, and a latch assembly 138 (FIG. 2). The operator platform assembly 112 is pivotable about the right and left pivot assemblies 132, 134 between an operating position in which the platform assembly 112 may be said to be "pivoted down" as illustrated in FIG. 2, and a stored position in which it may be said to be "pivoted up." During operation of the lawn mower 100, the operator platform assembly is pivoted down into the operating position and the operator stands on the operator platform 130. The term "operator zone" will be used to mean all areas of the lawn mower 100 that are accessible by an operator of the lawn mower 100 standing on the operator platform 130 during ordinary operation of the lawn mower 100.

While the platform 130 is in the operating position, the pivot limiting assembly 136 bears against the frame 110 to resist further downward pivoting of the operator platform 130 to support the weight of the operator. The pivot limiting assembly 136 may also include vibrations dampeners to improve the comfort of the operator. The latch assembly 138 is spring biased and automatically engages the platform 130 when the platform 130 is pivoted up into the stored position, to hold the platform 130 in the stored position until the latch assembly 138 is manually released.

In the illustrated embodiment, the right and left pivot assemblies 132, 134 are positioned behind the reference plane 126, 128 and below the horizontal axis of rotation 126. The right and left pivot assemblies 132, 134 include horizontal pins 154 (FIGS. 7-10). In the illustrated embodiment, the entirety of the operator platform 130 is behind the reference plane 126, 128 in both the operating and stored positions. In other embodiments, the operator platform 130 is at least partially behind the reference plane 126, 128.

Figure 3:
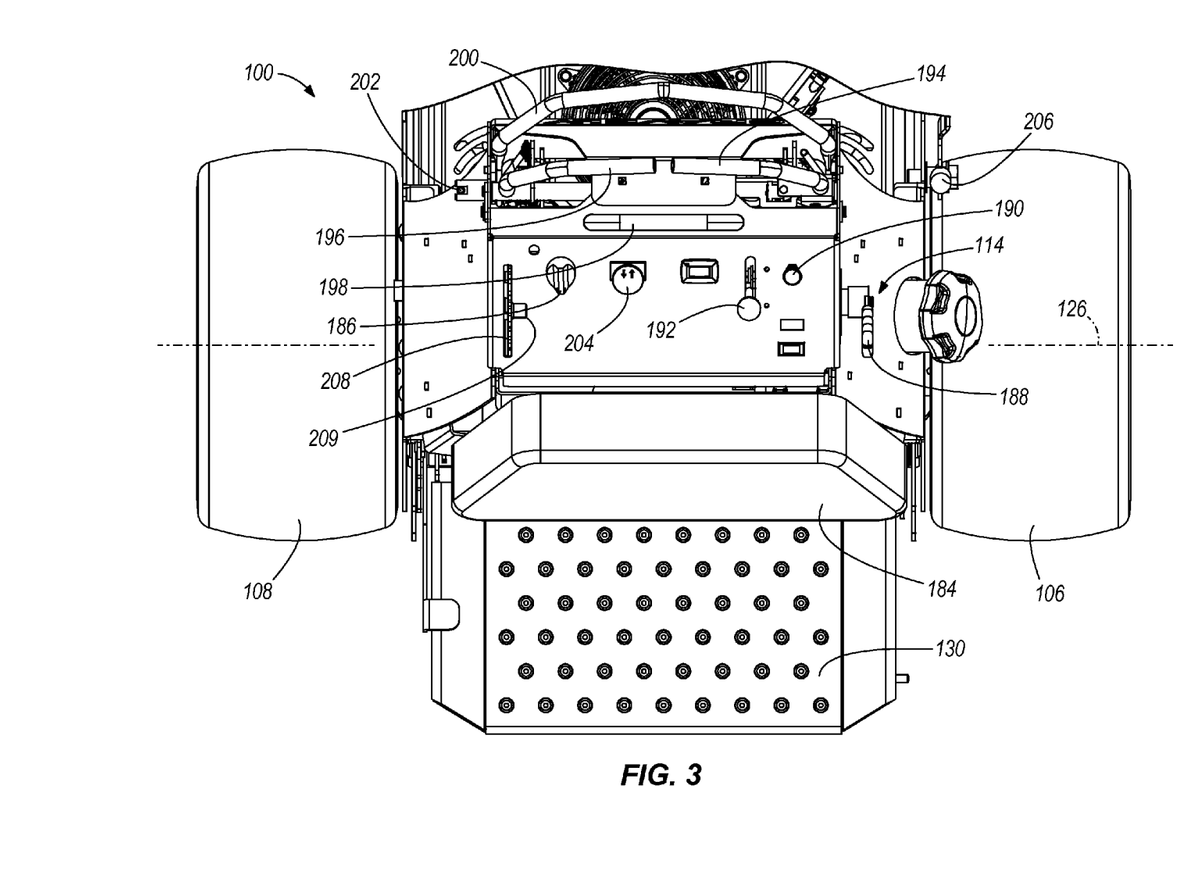
FIG. 3 is a top view of a portion of the lawn mower.

Referring to FIG. 3, the control tower 114 extends vertically from the frame 110 in front of the operator platform 130. Mounted to a rear-facing side of the control tower 114 is a cushion 184 against which a forward-leaning operator rests during operation of the lawn mower 100. The control tower 114 includes the following controls, all of which are in the operator zone: an ignition switch 186, a blade engagement control 188, a choke 190, an engine speed control 192, a right control arm 194, a left control arm 196, a reverse hard stop 198, a forward hard stop 200, a forward hard stop lock 202, an interlock 204, a deck lift hand lever 206, a height of cut selector 208, and a height of cut indicator 209. In the illustrated embodiment, at least some of the controls are located or locatable forward of the reference plane 126, 128 (i.e., a plane perpendicular to FIG. 3 and including the axis of rotation 126), but in an alternative preferred embodiment, at least the reverse hard stop 198, the right control arm 194, the left control arm 196, and the forward hard stop 200 are all moved rearward of the reference plane 126, 128.

Referring again to FIG. 4, the mower drive assembly 116 includes an engine deck 210, a fuel source 212, an engine 214, a right integrated transaxle 216, a left integrated transaxle 218, and a drive transmission assembly 220. The engine deck 210 is above the operator platform 130 when the operator platform 130 is in the operating position. The engine 214, acting through the drive transmission assembly 220, drives a pump in each of the right and left integrated transaxles 216, 218. The engine 214 also drives operation of the cutting deck transmission assembly 120 to cause cutting blades in the cutting deck assembly 118 to rotate and cut grass or other vegetation.

The right and left control arms 194, 196 are interconnect to motors within the right and left integrated transaxles 216, 218 to control the speed and direction of rotation of the respective right and left rear drive wheels 106, 108. The right and left control arms 194, 196 have a neutral position in which they do not cause any rotation of the right and left rear drive wheels 106, 108. When the right and left control arms 194, 196 are pushed forward from the neutral position by the operator, the respective right and left rear drive wheels 106, 108 rotate in a forward direction at a speed proportional to the degree of forward movement of the control arms 194, 196. When the right and left control arms 194, 196 are pulled rearward from the neutral position by the operator, the respective right and left rear drive wheels 106, 108 rotate in a reverse direction (opposite the forward direction) at a speed proportional to the degree of rearward movement of the control arms 194, 196. When one of the control arms is pushed forward and the other is pulled rearward, one of the drive wheels rotates in the forward direction and the other rotates in the reverse direction, giving rise to rotation of the lawn mower 100 about the ZT axis 128.

Referring now to FIG. 3, the reverse hard stop 198 provides a fixed frame of reference for the operator when manipulating the control levers 194, 196. The operator's hands and thumbs may rest on the reverse hard stop 198 while the operator's fingers pull one or both of the control arms 194, 196 rearward (i.e., in the reverse direction). Squeezing the control arms 194, 196 against the reverse hard stop 198 results in maximum reverse speed for the lawn mower 100. The operator's hands are less prone to bouncing or moving unintentionally due to the terrain when the operator's hands and fingers rest on the reverse hard stop 198.

The forward hard stop 200 is adjustable and locked in place by the forward hard stop lock 202. The forward hard stop 200 may be pivoted forward or rearward into a desired position by disengaging or unlocking the forward hard stop lock 202, pivoting the forward hard stop 200 to a desired position, and engaging or locking the forward hard stop lock 202. Once the forward hard stop 200 is set, a desired maximum forward speed has been established for the lawn mower 100. By squeezing the control arms 194, 196 against the forward hard stop 200, the operator achieves the desired maximum forward speed. When locked in place, the forward hard stop 200 is fixed with respect to the control tower 114 to provide a stable and fixed resting place for the operator's hands. The operator's hands and fingers rest on the forward hard stop 200, while the operator's thumbs manipulate the control arms 194, 196 in the forward direction. The forward hard stop 200 provides a frame of reference for the relative speed being requested of each drive wheel 106, 108. The operator's hands are less prone to bouncing or moving unintentionally due to the terrain when the operator's hands and fingers rest on the forward hard stop 200.

Referring again to FIG. 4, in the illustrated embodiment, the fuel source 212 is a gas tank that contains gasoline for use by the engine 214. The gas tank can include a primary tank and a back-up tank. The fuel source 212 is mounted to the engine deck 210. In the illustrated embodiment, the engine 214 is supported by the engine deck 210 and includes a power take off ("PTO") shaft 238 extending vertically down through the engine deck 210. The engine 214 also includes a PTO bearing that supports the PTO shaft 238 for rotation about a vertical axis of rotation. Although the illustrated embodiment includes an internal combustion engine 214 and a gasoline tank 212 as the prime mover and fuel source, respectively, other embodiments may include alternative prime movers and suitable fuel sources for such alternative prime movers. Examples of alternative prime movers and fuel sources include a hybrid engine and a source of natural gas or gasoline, an electric motor and batteries, and a fuel cell and hydrogen tank.

Figure 5:
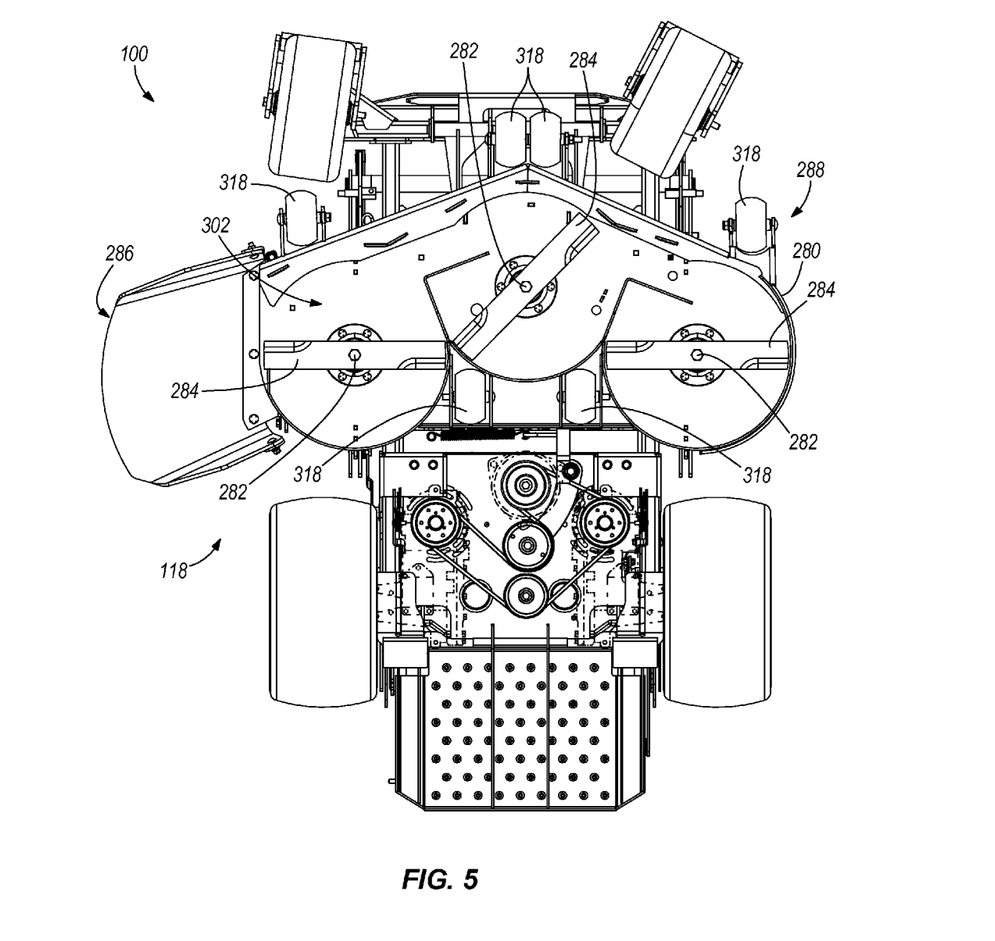
FIG. 5 is a bottom view of a cutting deck assembly of the lawn mower.
Figure 6:
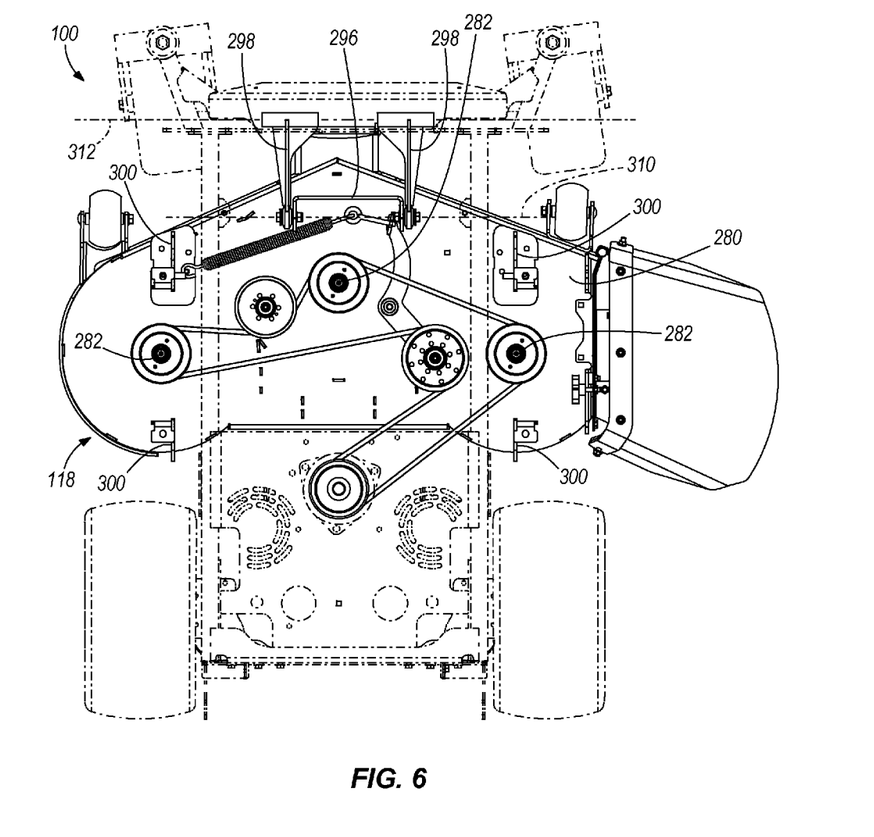
FIG. 6 is a top view of the cutting deck assembly and a cutting deck transmission assembly of the lawn mower.

As illustrated in FIGS. 5 and 6, the cutting deck assembly 118 includes a cutting deck 280, three spindles 282, three cutting blades 284, a discharge assembly 286, and an anti-scalp system 288. The cutting deck 280 includes a front mounting bracket 296, two front mounting arms 298, and four connection brackets 300. A cutting space 302 is defined below the cutting deck 280.

The front mounting bracket 296 is rigidly mounted on top of the cutting deck 280. The front mounting arms 298 each include a rear end and a front end. The rear end of each mounting arm 298 is pivotally interconnected to the front mounting bracket 296 about a horizontal pivot axis 310. The front end of each mounting arm 298 is pivotally interconnected to the front of the frame 110 about a horizontal pivot axis 312. The cutting deck 280 can pivot about both horizontal pivot axes 310 and 312 as the cutting deck 280 raises and lowers with respect to the frame 110. The four connection brackets 300 are rigidly mounted on top of the cutting deck 280. Each connection bracket 300 provides a horizontal pivot point (i.e., a hole) for interconnection with the cutting deck lift assembly 122, which will be discussed in more detail below.

The spindles 282 extend vertically through the top wall of the cutting deck 280, into the cutting space 302. Each of the spindles 282 is supported for rotation about a vertical axis of rotation. The cutting blades 284 have cutting edges at both ends and are designed to be mounted at their center points to a spindle 282. The blades 284 rotate under the deck to cut vegetation (e.g., grass). Cut vegetation is referred to as "clippings". The clippings then move, under the influence of air currents created by the rotating cutting blades 284 out the discharge assembly 286. The discharge assembly 286 may be pivotable about a horizontal axis to pivot up, and may include a flexible, resilient material that resiliently deflects upon bumping against an object.

The anti-scalp system 288 includes six passive wheel assemblies 318. Each of the wheel assemblies 318 includes a bracket mounted to the side of the cutting deck, and a wheel that is rotatable within the bracket. Four of the passive wheel assemblies 318 are mounted to the front of the cutting deck 280, and two of the passive wheel assemblies 318 are mounted to the rear of the cutting deck 280. The anti-scalp system 288 defines a minimum spacing between the cutting deck 280 and the ground over which the lawn mower 100 travels.

The cutting deck 280 is similar to that used on the Gravely Pro-Stance Float Deck model numbers 994109 and 994110 manufactured by Ariens Company of Brillion, Wis. Different cutting decks of various widths can be used. Typical widths include 48 inches and 52 inches.

Figure 7:
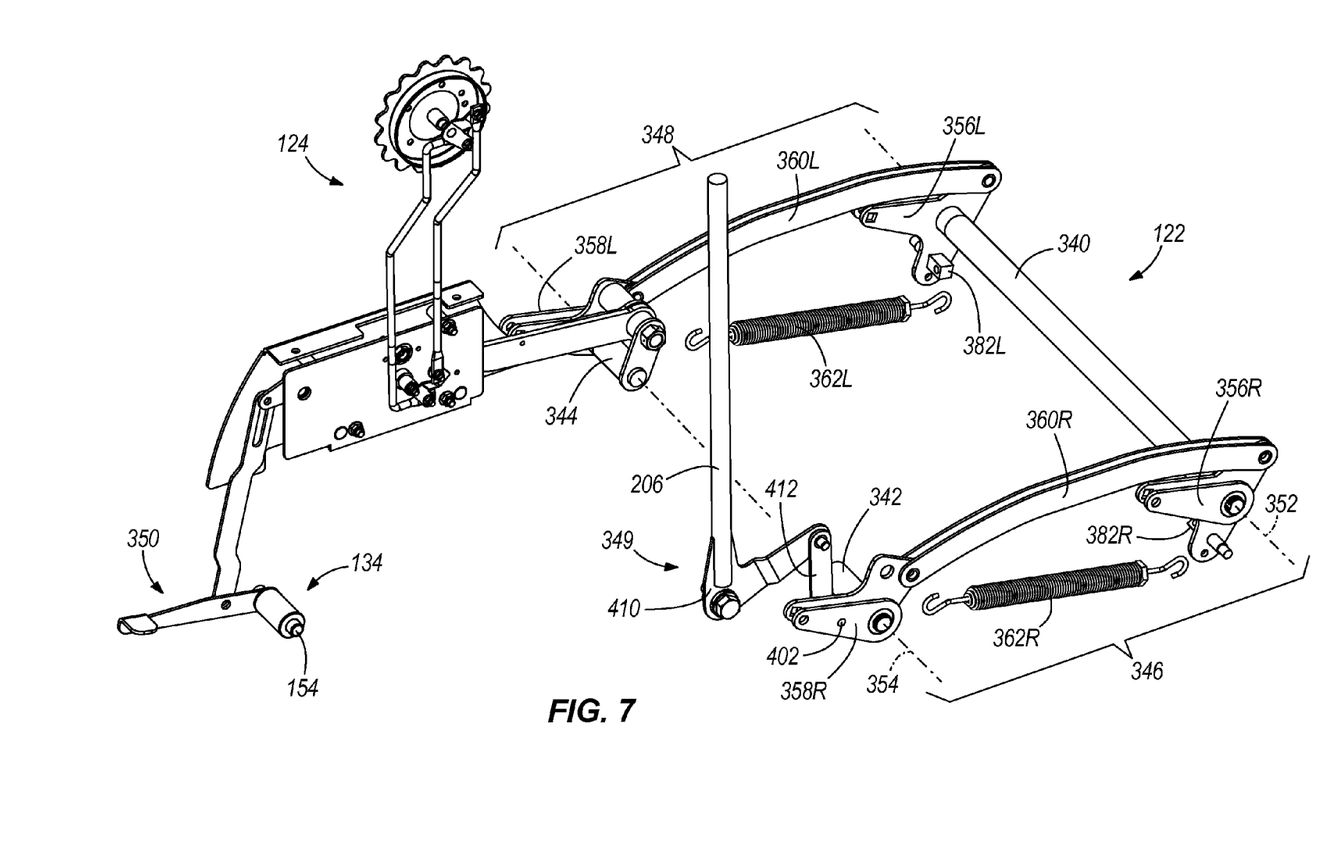
FIG. 7 is a perspective view of a deck lift assembly and height-of cut assembly of the lawn mower.

With reference to FIG. 7, the cutting deck lift assembly 122 includes a front pivot shaft 340, a right rear pivot shaft 342, a left rear pivot shaft 344, a right lift assembly 346, a left lift assembly 348, a hand actuator assembly 349, and foot actuator assembly 350.

The front pivot shaft 340 extends across the front of the frame 110 and through side rails of the frame 110. The front pivot shaft 340 includes right and left ends that extend beyond the right and left sides of the frame 110. The front pivot shaft 340 defines a longitudinal axis 352 that may also be termed the front deck lift axis. Journal bearings support the front pivot shaft 340 at each side of the frame 110 and the front pivot shaft 340 is rotatable with respect to the frame 110 about the front deck lift axis 352.

The right and left rear pivot shafts 342, 344 are mounted in cantilever fashion to the frame 110, rearward of the front pivot shaft 340 and generally above the rear portion of the cutting deck assembly 118. The right and left rear pivot shafts 342, 344 extend beyond the right and left sides of the frame, respectively. The right and left rear pivot shafts 342, 344 define longitudinal axes that are collinear with each other. The line that includes the longitudinal axes of the right and left rear pivot shafts 342, 344 may be termed a rear deck lift axis 354. The right and left rear pivot shafts 342, 344 are supported by journal bearings in the frame 110 to rotate or pivot about the rear deck pivot axis 354.

The right lift assembly 346 includes a right front lifting bracket assembly 356R, a right rear lifting bracket assembly 358R, a right synchronizing arm 360R, and a right spring 362R. The left lift assembly 348 includes a left front lifting bracket assembly 356L, a left rear lifting bracket assembly 358L, a left synchronizing arm 360L, and a left spring 362L. Each front lifting bracket assembly 356R, 356L includes a spring anchor 382R, 382L.

Each of the lifting brackets 356R, 356L, 358R, 358L is pinned to the associated synchronizing arm 360R, 360L. The front lifting bracket assemblies 356R, 356L are rigidly coupled to the respective right and left ends of the front pivot shaft 340, such that the right and left lift assemblies 346, 348 actuate together. The parts of the right and left lift assemblies 346, 348 may be called movable components of the deck lift assembly 122. Pivoting of any one of the lifting brackets 356R, 356L, 358R, 358L causes all other lifting brackets to pivot, and prevention of any one of the lifting brackets 356R, 356L, 358R, 358L from pivoting prevents the other lifting brackets from pivoting. The lifting brackets 356R, 356L, 358R, 358L are interconnected with the brackets 300 on the cutting deck 280, as for example by chains, such that the cutting deck assembly 118 raises and lowers as the lifting brackets pivot.

The right and left springs 362R, 362L are linear springs having one end connected to the spring anchor 382R, 382L of the associated front lifting bracket assembly 356R, 356L and another end secured to the frame 110. The springs 362 provide a biasing force or torque on the front lifting bracket assemblies 356R, 356L to provide lift assistance for raising the cutting deck assembly 118 up toward the travel position. Other spring arrangements are suitable, including torsion springs acting on any or all of the front, rear, or front and rear lifting bracket assemblies 356R, 356L, 358R, 358L.

The hand actuator assembly 349 includes a hand pivot bracket 410, a lifting link 412, and the deck lift hand lever 206. The hand pivot bracket 410 is pivotally mounted to the control tower 114. The lifting link 412 is pinned at one end to the hand pivot bracket 410 and is pinned at the opposite end to the actuation hole 402 of the right rear lifting bracket assembly 358R. The deck lift hand lever 206 is rigidly affixed, as by welding or with two fasteners, to the hand pivot bracket 410.

The deck lift hand lever 206 is within the operator zone. Upon grasping the deck lift hand lever 206 and pulling it rearward, an operator pivots the hand pivot bracket 410, which lifts the lifting link 412. The lifting link 412 actuates the right lift assembly 346 through the right rear lifting bracket assembly 358R by pivoting the right rear lifting bracket assembly 358R in a first direction, which may also be called the raising direction. This causes the other lifting brackets 356R, 356L, 358L to pivot in the first or raising direction, and results in the cutting deck assembly 118 raising. Upon release of the lever 206, the deck lowers under the influence of gravity, causing the bracket assemblies 358R, 356R, 356L, 358L to pivot in a second direction, which can be referred to as the lowering direction.

Figure 8:
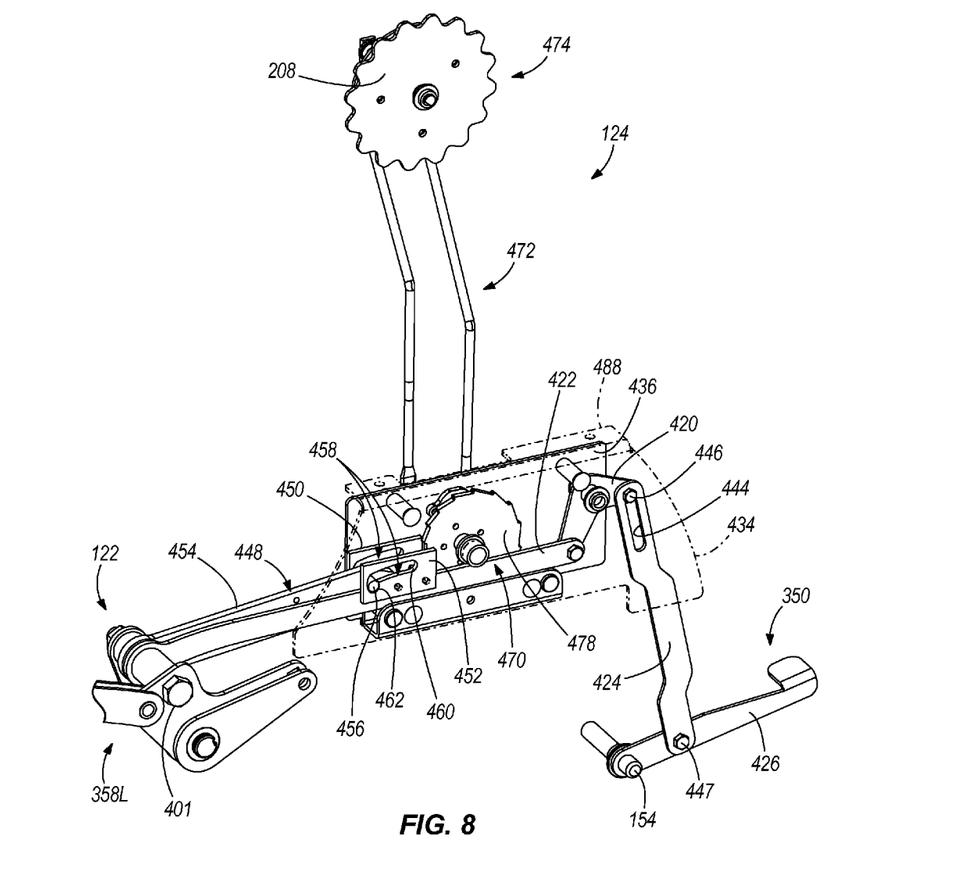
FIG. 8 is a perspective view of a portion of the height-of-cut assembly.

With additional reference to FIG. 8, the foot actuator assembly 350 includes a foot pivot bracket 420, a push link 422, a slotted arm 424, and a deck lift foot lever 426. The foot pivot bracket 420 is pivotally mounted to the control tower 114 between a left plate 434 and a right plate 436 that are positioned in the left side of the control tower 114. The left and right plates 434, 436 are supported by a U-shaped member 476 (FIG. 10) that is mounted to their lower edges. The push link 422 is pinned at one end to the foot pivot bracket 420 and is interconnected with a pin 401 at the opposite end to the left rear lifting bracket assembly 358L.

The slotted arm 424 includes an upper end and a lower end. The upper end includes an elongated slot 444. A pin 446 rigidly affixed to the foot pivot bracket 420 is captured in the elongated slot 444. The lower end of the slotted arm 424 is pivotally interconnected to the deck lift foot lever 426 with a fastener 447 between the opposite ends of the deck lift foot lever 426. The fastener 447 acts as a pivot pin. One end of the deck lift foot lever 426 is pivotally interconnected to the pivot pin 154 of the left pivot assembly 134 of the operator platform assembly 112. The deck lift foot lever 426 is within the operator zone and pivots about the same pivot axis (i.e., that defined by pivot pin 154) as the operator platform 130.

The deck lift foot lever 426 can be pivoted up to a storage position in which the deck lift foot lever 426 is substantially vertical. As the deck lift foot lever 426 is pivoted about the pin 154 toward the storage position, the slotted arm 424 is lifted a distance not greater than the spacing between the fastener 447 and the pivot pin 154. The elongated slot 444 has a length at least equal to the distance between the fastener 447 and the pivot pin 154, and therefore allows the slotted arm 424 to move upward with respect to the pin 446 without having the pin 446 bottom out in the slot 444 as the deck lift foot lever 426 is pivoted into the stored position. The elongated slot 444 may therefore be said to permit lost motion between the slotted arm 424 and the pin 446 as the deck lift foot lever 426 is pivoted into the stored position and back down to the operational position.

In some embodiments, the platform 130 and slotted arm 424 pivot together into the stored and operational positions (i.e., if one is pivoted the other pivots with it) and in other embodiments one or both of the platform 130 and slotted arm 424 are pivotable into the stored position while the other remains in the operational position or pivotable into the operational position while the other remains in the stored position. In still other embodiments, the deck lift foot lever 426 pivots about an axis different than the axis defined by the pivot pin 154.

As the deck lift foot lever 426 pivots down under the influence of a downward force (i.e., the operator stepping down on it), the slotted arm 424 is pulled down. The top end of the slot 444 in the upper end of the slotted arm 424 engages the pin 446 on the foot pivot bracket 420 and causes the foot pivot bracket 420 to pivot. In response to pivoting of the foot pivot bracket 420, the push link 422 is moved linearly, generally forward. The forward linear motion of the push link 422 pivots the left rear lifting bracket assembly 358L in the first direction through the pin 401 interconnection. The other lifting brackets 356L, 356R, 358R pivot in unison in the first direction with the left rear lifting bracket 358L, which lifts the cutting deck 280. Upon removing the downward force from the deck lift foot lever 426, the deck lowers under the influence of gravity, causing the bracket assemblies 358R, 356R, 356L, 358L to pivot in the second direction.

Figure 9:
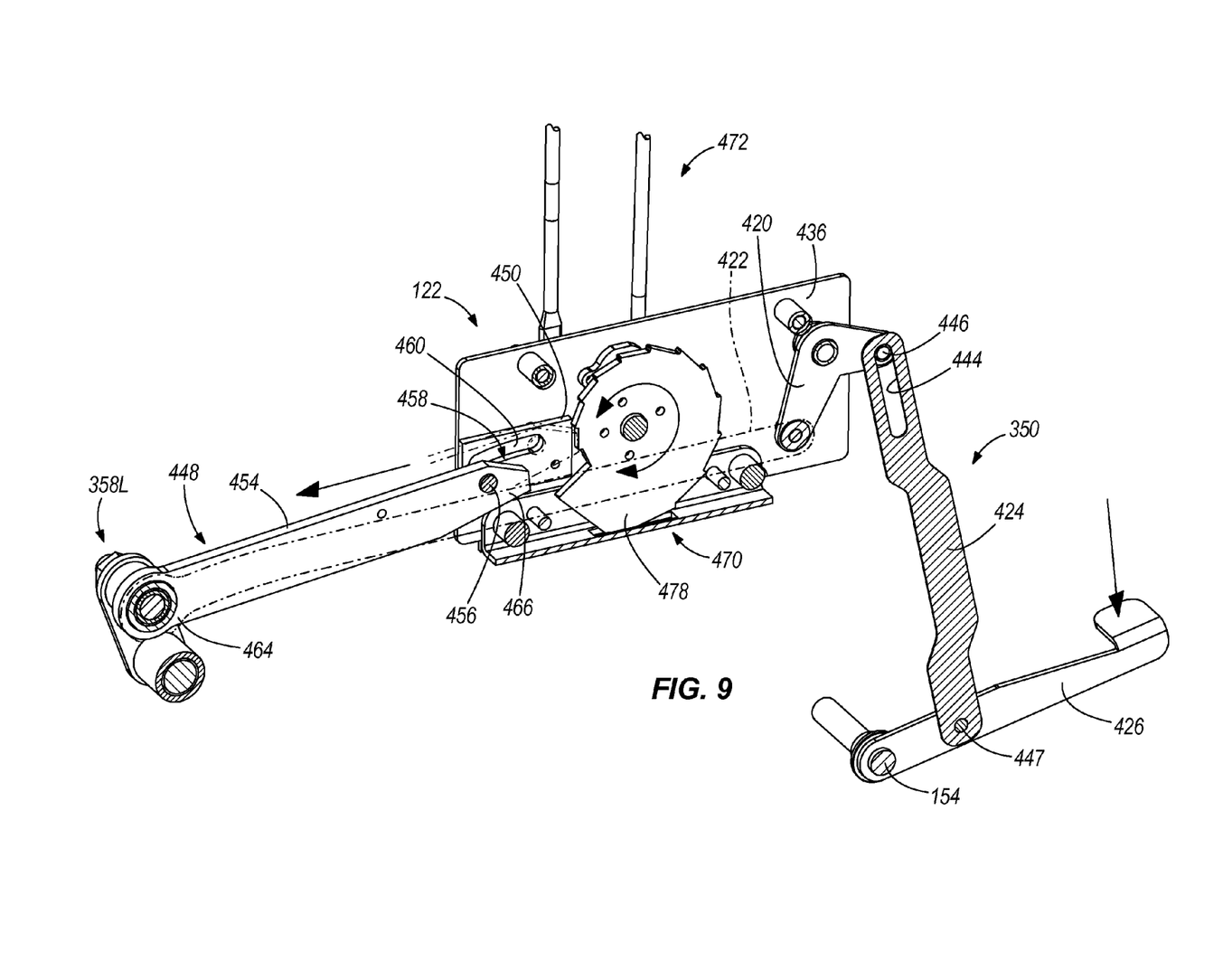
FIG. 9 is another perspective view of a portion of the height-of-cut assembly.

With reference to FIGS. 8 and 9, the cutting deck lift assembly 122 also includes a cutting deck prop assembly 448. The cutting deck prop assembly 448 includes a right prop bracket 450, a left prop bracket 452, a deck prop 454, and a transverse pin 456. The right prop bracket 450 is mounted to the right plate 436 on the left side of the control tower 114 and the left prop bracket 452 is mounted to the left plate 434. Each of the prop brackets 450, 452 includes a slot 458 having a straight portion 460 (which may also be referred to as the "height-of-cut zone" of the slot) and a hook or undercut 462 front end (which may also be referred to as the "travel zone" of the slot 458). The deck prop 454 includes first and second opposite ends 464 and 466. The first end 464 of the deck prop 454 is pivotally interconnected to the left rear lifting bracket assembly 358L with the pin 401 that pivotally couples the push link 422 to the left rear lifting bracket assembly 358L. The second end 466 of the deck prop 454 includes a hole through which extends the transverse pin 456. The right and left ends of the transverse pin 456 ride in the slots 458 in the respective right and left prop brackets 450, 452.

As the cutting deck 280 raises, the deck prop 454 is moved linearly forward, which moves the transverse pin 456 forward in the height of cut portion 460 of the slots 458. When the deck 280 achieves the travel position (i.e., full up), the pin 456 is received in the hook or undercut 462 in the forward end of the slot 458 in each of the right and left prop brackets 450, 452. The deck 280 is maintained in the travel position by engagement of the transverse pin 456 in the undercuts 462. The weight of the deck 280 applies a linear, compressive load to the deck prop 454, which results in a line of force applied by the transverse pin 456 on the undercuts 462. The geometry of the undercuts 462 and the direction of the line of force maintains the transverse pin 456 in the undercuts 462. The deck 280 is therefore propped by this mechanical interconnection in the travel position until the operator desires to lower the cutting deck 280.

The transverse pin 456 may be removed from the undercuts 462 with a "kicker" release, or other linkage that moves the transverse pin 456 out of the travel zone and into the height-of-cut zone 460 of the slots 458.

Figure 10:
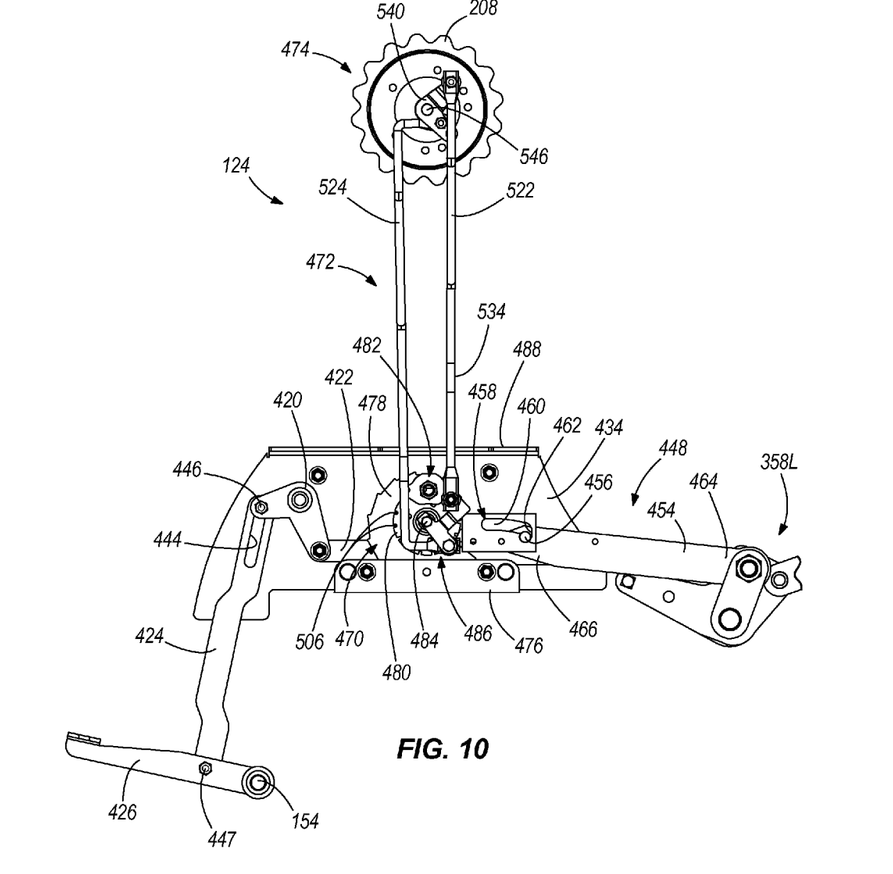
FIG. 10 is a side view of a portion of the height-of-cut assembly.

As illustrated in FIGS. 8-11, the height-of-cut assembly 124 includes a height setting cam assembly 470, a height setting linkage 472, and a height setting operator interface 474. The height setting cam assembly 470 includes a cam 478, a positioning plate 480 (FIG. 10), a ball-spring assembly 482, an axle 484, and a lower driving link 486 (FIG. 10). The left plate 434 includes a top flange 488 that includes a cut out to accommodate the height setting linkage 472.

The cam 478 is mounted on the axle 484, and coupled to the axle 484 for rotation. In other embodiments, the cam 478 may be replaced by another adjustable height setting member. The positioning plate 480 is secured to the inner surface of the cam 478 and is mounted on the axle 484. The lower driving link 486 is also secured to the axle 484. The cam 478, positioning plate 480, axle 484, and lower driving link 486 are coupled with each other for rotation together about a horizontal axis of rotation.

Figure 11:
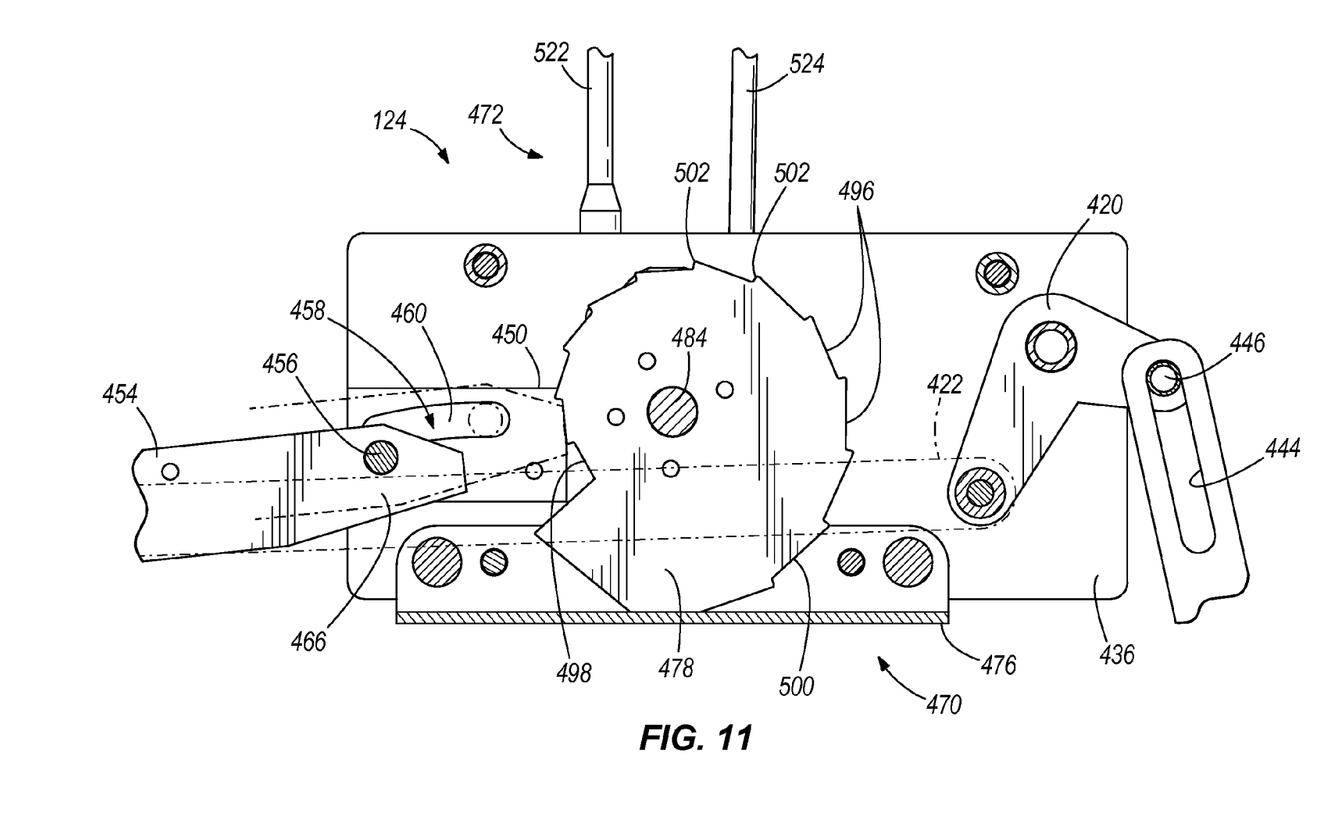
FIG. 11 is an enlarged side view of a portion of the height-of-cut assembly.

As illustrated in FIG. 11, the periphery of the cam 478 defines a plurality of height-of-cut stop surfaces 496 arranged along a cam profile. The stop surfaces 496 vary in radial distance from the axis of rotation of the cam 478. A first stop surface 498 is closest to the axis of rotation, and the stop surfaces 496 progressively move radially away from the axis of rotation, step by step along the cam profile until the last height-of-cut stop surface 500 is reached, which is radially the farthest from the axis of rotation. Because each stop surface 496 is at a larger radial distance from the axis than the previous stop surface (i.e. each stop surface "steps out" with respect to the previous stop surface), a shoulder 502 is defined between adjacent stop surfaces 496. The stop surfaces 496 are flat, and define planar surfaces that are parallel to the axis of rotation of the cam 478.

The stop surface 496 that is positioned at the front of the cam 478 is generally vertically oriented and is configured to be engaged by the second end 466 of the deck prop 454. The stop surface 496 in this position may be said to be in the "engagement position." Because of the configuration of the cam 478 in the illustrated embodiment, a shoulder 502 is above the stop surface 496 in the engagement position.

The weight of the deck cutting 280 applies a torque load or a moment on each of the lifting bracket assemblies 356R, 356L, 358R, 358L. The moment on the rear left lift bracket 358L is converted into a linear load to the deck prop 454. The straight portions 460 of the slots 458 are above the first end 464 of the deck prop 454, such that the transverse pin 456 riding in the straight portions 460 keeps the second end 466 above the first end 464. The linear load is therefore applied along a line of force that is generally rearward and upward, and the second end 466 of the deck prop 454 is pressed against the cam 478 in that direction. The deck prop 454 also bears against the shoulder 502 above the stop surface 496 in the engagement position. In other words, the second end 466 of the deck prop 454 is received in the corner defined by the shoulder 502 and the stop surface 496. The stop surface 496 bears a normal load component of the linear load on the deck prop 454.

The deck prop 454 prevents the cutting deck assembly 118 from lowering with respect to the frame 110 beyond the point at which the deck prop 454 engages the stop surface 496 in the engagement position. More specifically, the deck prop 454 bears a compressive load that prevents rotation of the rear left lifting bracket 358L in the second (deck-lowering) direction. Since all of the lifting brackets 356R, 358R, 356L, and 358L are interconnected via the synchronizing arms 360R and 360L and the front pivot shaft 340, when one of the lifting brackets 356R, 358R, 356L, and 358L is prevented from pivoting in the second (lowering) direction, all lifting brackets 356R, 358R, 356L, and 358L are prevented from pivoting in the second direction. In other embodiments, a movable component other than the lifting brackets 356R, 358R, 356L, and 358L may be employed, and such movable component may move linearly or otherwise instead of pivoting.

The transverse pin 456 is positioned at different positions along the height of cut zone 460 of the slots 458, depending on which stop surface 496 is in the engagement position. The height of cut zone 460 is sufficiently long so that the transverse pin 456 is in the height of cut zone 460 when the first stop surface 498, last stop surface 500, and any stop surface 496 in between is in the engagement position, and has a sufficient additional length so the prop 454 can be pulled forward slightly to rotate the cam 478, without dropping the pin 456 into the undercut 462.

Referring to FIG. 10, multiple radial detent slots 506 are formed in the periphery of the positioning plate 480. The ball-spring assembly 482 is mounted to the left plate 434 and includes a ball-spring received within a hub. The spring biases the ball against the positioning plate such that the ball is received by the detent slot 506 with which it is aligned.

The height setting linkage 472 includes a front link 522 and a rear link 524. Each link 522, 524 comprises a top section, a bottom section, and a length adjustment piece 534 connecting the top and bottom sections. The length adjustment piece 534 allows the overall length of the links 522, 524 to be adjusted. The bottom section of the front link 522 is pivotally secured to a first arm of the lower driving link 486. The bottom end of the rear link 524 is secured to a second arm of the lower driving link 486.

The height setting operator interface 474 includes the height of cut selector 208, an upper driving link 540, and a support shaft 546. The height of cut selector 208 and the upper driving link 540 are coupled for rotation with the support shaft 546. The height of cut selector 208 includes a series of alternating peaks and valleys. The cutting height indicator 209 (FIG. 3) is positioned near or on the cutting height selector 208 on top of the tower 114 to indicate a cutting height set point that corresponds with current position of the cutting height selector 208. The upper driving link 540 includes a first arm pinned to the top section of the front link 522 and a second arm pinned to the top section of the rear link 524.

To adjust the height of cut setting of the lawn mower 100, one of the deck lift hand lever 206 and deck lift foot lever 426 is actuated to raise the cutting deck 280 slightly. As the rear-left lifting bracket 358L pivots, the deck prop 454 is pulled forward and disengaged from the stop surface 496 in the engagement position. With the deck prop 454 out of engagement with the cam 478, the operator rotates the height of cut selector 208. Rotating the height of cut selector 208 causes the upper driving link 540 to rotate in kind. The rotation of the upper driving link 540 causes the front link 522 to move down or up and the rear link 524 to move in the opposite direction. The geometry of the height setting linkage 472 and the upper and lower driving links 540 and 486 ensures that the front link 522 and the rear link 524 move in opposite directions and that at least one of the links 522 and 524 can apply a torque to the lower driving link 486, thereby rotating the lower driving link 486.

Rotation of the lower driving link 486 causes the axle 484, the positioning plate 480, and the cam 478 to rotate as a unit. Rotation of the positioning plate 480 deflects the spring in the ball-spring assembly 482 so the ball can move out of the current detent slot 506. Stated another way, the ball-spring rides out of the detent slot 506 when sufficient torque is applied to the positioning plate 480 to overcome the spring bias of the ball spring.

As the rotation of the positioning plate 480 aligns the ball spring with the next detent slot 506, the ball spring extends into the next detent slot 506 which allows the user to feel and hear a positioning "click" that indicates to the user that the next cutting height set point has been reached. Rotation of the cam 478 positions a different cam stop 496 in the engagement position. The new cutting height set point is indicated by the cutting height indicator 209 on the operator console on top of the tower 114. The operator can therefore "dial in" a desired height of cut from the operator zone while the mower is in use.

Alternatively, the height of cut selector 208 and the cam 478 can be interconnected by other appropriate assemblies so that movement of the height of cut selector 208 moves the cam 478 in kind. For example, a belt or chain could be used to interconnect the axle 546 that rotates with the height of cut selector 208 to the axle 484 that rotates with the cam 478.

After the user has rotated the height of cut selector 208 to the desired cutting height set point, the deck lift hand lever 206 or the deck lift foot lever 426 (whichever was actuated) is released and the cutting deck 280 lowers under the influence of gravity until the deck prop 454 engages the stop surface 496 and shoulder 502 in the engagement position. In this regard, the deck prop 454 may be considered part of the cutting deck lift assembly 122 and the height-of-cut assembly 124.

Various features of the invention are set forth in the following claims.

What is claimed is:

1. A lawn mower comprising:
   a plurality of wheels;
   a frame supported by the wheels;
   an operator platform assembly coupled to the frame and configured to support an operator;
   a control tower extending vertically from the frame in front of the operator platform assembly, the control tower including controls within an operator zone, the operator zone being within reach of the operator of the lawn mower while standing on the operator platform assembly during use of the lawn mower;
   a mower drive assembly supported by the frame and driving rotation of at least one of the wheels to propel the lawn mower;
   a cutting deck assembly including a cutting deck and at least one rotatable cutting blade beneath the cutting deck, the rotatable cutting blade rotating under the influence of the mower drive assembly, a height of the cutting deck assembly corresponding to a height of cut at which the cutting blade cuts grass under the cutting deck; and
   a height of cut assembly including an adjustable height setting member providing a plurality of stop surfaces and a prop engageable with the height setting member, the height of cut assembly also including an adjustment mechanism that actuates the adjustable height setting member to place the prop in abutment with a selected one of a first stop surface and a second stop surface, the adjustment mechanism including
      a height setting operator interface located in the operator zone of the control tower, and
      a linkage operably connecting the height setting operator interface and the adjustable height setting member,
   wherein engagement of the prop with the first stop surface on the adjustable height setting member holds the cutting deck assembly at a first height corresponding to a first height of cut, and engagement of the prop with the second stop surface on the adjustable height setting member holds the cutting deck assembly at a second height corresponding to a second height of cut different from the first height of cut.

2. The lawn mower of claim 1, wherein the mower drive assembly includes first and second motors driving respective first and second of the plurality of wheels; and wherein the first and second motors are independently controllable to permit zero radius turning of the lawn mower.

3. The lawn mower of claim 1, further comprising a cutting deck lift assembly operable to raise the height of the cutting deck assembly; wherein the cutting deck assembly lowers under the influence of gravity upon release of the cutting deck lift assembly; wherein the prop abuts the first stop surface of the adjustable height setting member to prevent the cutting deck assembly from lowering below the first height.

4. The lawn mower of claim 3, wherein the prop includes a first end interconnected to a movable component of the cutting deck lifting assembly, the movable component moving in a first direction during raising of the cutting deck assembly and in a second direction during lowering of the cutting deck assembly; wherein the prop includes a second end movable in response to movement of the moving component into engagement with one of the first and second stop surfaces of the adjustable height setting member; and wherein the prop resists movement of the movable component in the second direction while the prop is engaged with one of the first and second stop surfaces.

5. The lawn mower of claim 4, wherein the movable component includes a pivotable lifting bracket.

6. The lawn mower of claim 3, wherein the adjustable height setting member is adjustable to place the prop in abutment with the second stop surface to prevent the cutting deck assembly from lowering below the second height.

7. The lawn mower of claim 1, further comprising a deck lifting assembly including an actuator in the operator zone, the deck lifting assembly operable to lift the mower deck assembly upon actuation of the actuator, to remove the prop from abutment with the adjustment mechanism; wherein the adjustment mechanism is adjustable while the prop is not in abutment with the adjustment mechanism.

8. The lawn mower of claim 7, wherein the actuator includes a hand actuator that is actuated by an operator's hand and a foot actuator that is actuated with an operator's foot.

9. The lawn mower of claim 1, wherein the adjustable height setting member includes a cam having a cam surface that includes the first and second stop surfaces.

10. The lawn mower of claim 9, wherein the cam surface includes a shoulder associated with each of the first and second stop surfaces; and wherein the prop engages the associated shoulder when engaging the first and second stop surfaces.

11. The lawn mower of claim 1, further comprising at least one prop bracket defining a slot; wherein the prop includes a transverse pin received within the slot; wherein movement of the prop into and out of abutment with the adjustable height setting member is guided by a transverse pin in the prop moving in the slot.

12. The lawn mower of claim 11, wherein the slot includes a height of cut zone and a travel zone; wherein the transverse pin is within the height of cut zone while the prop engages the first and second stop surfaces; wherein the transverse pin is within the travel zone when the cutting deck assembly is moved into a full-up position that is higher than the first and second heights; and wherein the cutting deck assembly is maintained in the full-up position by engagement of the transverse pin in the travel zone to facilitate movement of the lawn mower between areas of vegetation to cut.

13. The lawn mower of claim 1, further comprising a detent mechanism for resiliently holding the adjustable height setting member at a selected position; wherein the detent mechanism permits movement of the adjustable height setting member upon sufficient force applied to the height setting member.

* * * * *